Aug. 29, 1967  A. S. E. REUTERFORS  3,338,278
SABER-TYPE SAW
Filed Dec. 6, 1965
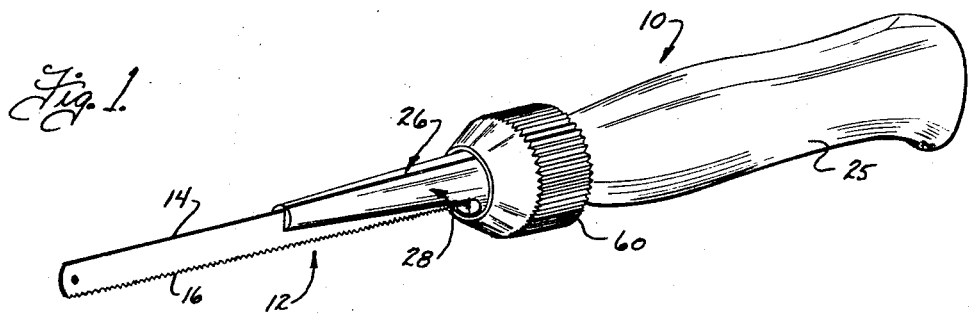
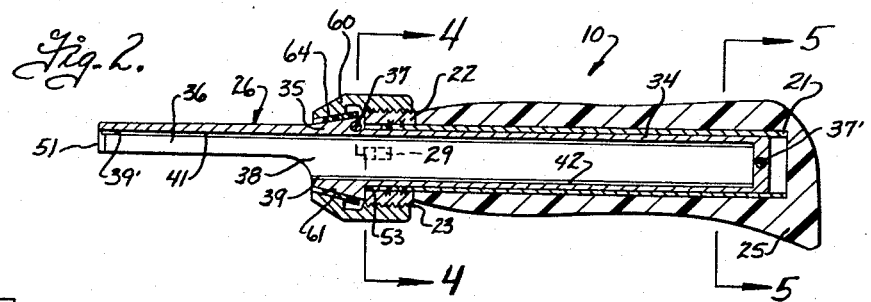
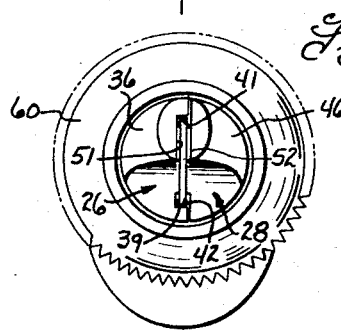 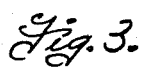 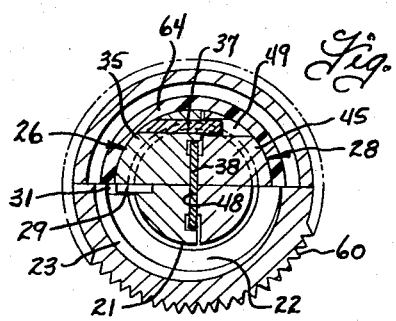
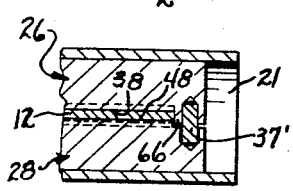 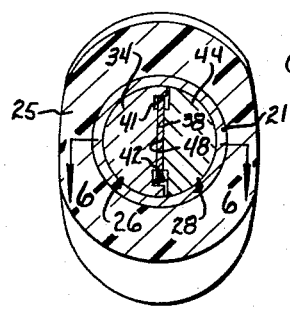
Inventor
Alder A. E. Reuterfors
By
McCanna, Morsbach & Pillote
Attorneys United States Patent Office 3,338,278
Patented Aug. 29, 1967

3,338,278
SABER-TYPE SAW
Aldor S. E. Reuterfors, Rockford, Ill., assignor to Estwing Manufacturing Company, Inc., Rockford, Ill., a corporation of Illinois
Filed Dec. 6, 1965, Ser. No. 511,672
10 Claims. (Cl. 145—31)

ABSTRACT OF THE DISCLOSURE

A saw including an elongate tubular handle encasing a pair of jaws which grip a hacksaw blade. The jaws have a frusto-conical outer portion which engages the end of the handle. A clamping nut surrounds the jaws and threads onto the end of the handle to tighten against the frusto-conical portion.

This invention relates generally to hand saws and more particularly to an improved saber-type saw.

It is an object of this invention to provide an improved saw adapted for use with an ordinary replaceable blade such as a hacksaw blade.

Another object is to provide a saber-type saw having improved means for securely clamping the blade in operative position.

Still another object is to provide a saw in accordance with the foregoing wherein at least part of the blade is gripped along the major portion of its periphery and is arranged to accommodate the set of the saw teeth.

Yet another object is to provide an improved saw in accordance with the foregoing which non-rotatably secures the blade with respect to the handle.

Other objects are to provide an improved saw which has a minimum number of parts, is attractive, and readily clamps the blade by a simple tightening means.

Other objects and advantages of this invention will become apparent as the same becomes better understood by reference to the following description and the drawings wherein:

FIGURE 1 is a perspective view of an embodiment of the present invention;

FIGURE 2 is a longitudinal sectional view taken along line 2—2 of FIGURE 3;

FIGURE 3 is an end view as seen from the left of FIGURE 1;

FIGURE 4 is a cross-sectional view taken generally along broken line 4—4 of FIGURE 2;

FIGURE 5 is a cross-sectional view taken along line 5—5 of FIGURE 2; and

FIGURE 6 is a longitudinal sectional view taken generally above line 6—6 of FIGURE 5.

The saw illustrated in the drawings includes a saw blade holder, generally designated as 10, and a cutting blade, such as an ordinary hacksaw blade 12. The saw blade may be of suitable cutting steel shaped to provide a longitudinally extending upper edge 14 and a longitudinally extending lower cutting edge 16 having a plurality of cutting teeth thereon. The teeth may have a set as illustrated in FIGS. 3–5.

The saw blade holder includes a longitudinal sheath or handle which, in the embodiment illustrated, includes an elongate tubular member 21 and a larger diameter ring 22 attached adjacent one end of the tubular member by any convenient means. At least a portion of the outer periphery of the ring is threaded, as at 23, for a purpose which will hereafter become apparent. A resilient gripping portion 25 is attached to the tubular member and conveniently provides a casing for the same. The gripping portion extends from the rear side of the ring to a point adjacent the other end of the tubular member and conveniently provides a closure for that other end, as shown in FIG. 2. A pair of complementary jaws 26 and 28 are mounted and positioned inside the tubular member 21. The jaws are arranged for easy sliding into the passageway defined by the tubular member and are preferably closely adjacent the inner surface thereof. The positioning is accomplished by means of a key 29 (FIG. 4) extending laterally from jaw 26 and arranged for fitting in a slot 31 adjacent the front end of ring 22. In this manner, jaw 26 is non-rotatably positioned in the tubular member.

As best seen in FIGS. 3–5, jaws 26 and 28 are preferably complimentary. As shown, jaw 26 includes an inner portion 34 having a generally semi-circular cross-section (FIG. 5), an intermediate portion having a semi-frusto-conical portion 35, and a forwardly-extending portion 36 which tapers upwardly from the cutting edge of the blade and tapers forwardly to its out end (FIG. 3). Pins 37 and 37' extend laterally from the intermediate portion and inner portion, respectively, for a purpose which will hereafter become apparent. Jaw 26 preferably has a flat clamping face 38 extending generally the full length thereof and adjacent jaw 28. Preferably, a groove 39 is arranged adjacent the lower edge of the clamping face and has a sufficient size for receiving the set of the saw blade teeth. An upper groove 39', adjacent the upper edge of the clamping face, is conveniently provided for reversing the saw blade so that the teeth are disposed upwardly, if desired. As shown, groove 39 extends the full length of the intermediate and inner portions of jaw 26. Groove 39' extends substantially the full length of the jaw. Laterally extending shoulders or flanges 41 and 42 are located adjacent the grooves 39' and 39, respectively, and extend toward jaw 28 at least to a point adjacent to the opposite side of a sawblade engaged to face 38. In this manner, shoulder 41 serves as an engaging face for the top edge 14 of the blade and sholder 42 serves as a conveniently spaced cover for the teeth, as shown in FIGS. 3–5. Additionally, if the blade becomes cocked during use, the lower edge 16 will be engaged by shoulder 42 to limit such movement. These functions would be reversed if the blade were inverted in the jaws.

Similiarly, jaw 28 has an inner portion 44 of generally semi-circular cross-section, an intermediate portion 45 (FIG. 4), and a forwardly-extending portion 46. As stated above, jaw 28 is complementary to jaw 26 and, for this purpose, has a clamping face 48 extending laterally from the main body of the jaw and toward clamping face 38. Jaw 28 has a slot 49 in its intermediate portion and arranged for receiving pin 37. The jaw has another slot (FIG. 6) in its inner portion arranged for receiving pin 37'. The pins and slots serve to align the jaws and their clamping faces and aid in positioning the same. When so assembled, the particular configuration of laterally extending face 48 and the body of the jaw provides an extension of grooves 39 and 39' for the purposes above indicated. As can be seen, the clamping faces extend generally the full length of the jaws and thus grip the blade along a considerable length of the blade. This allows the blade to be securely held in operative position. It can also be seen that the width of the clamping faces at the inner and intermediate portions of the jaws engage the blade along the major portion of the surface thereof. As shown in FIG. 3, the outer ends of the jaws are tapered as at 51 and 52 to aid in the insertion of the blade between the jaws.

When assembled, the intermediate portions of jaws 26 and 28 provide a generally frusto-conical outer surface diverging toward the rear of the jaw. Preferably, the extremity of this portion has a diameter less than the outer diameter of the threaded ring 22. This frusto-conical surface terminates in a shoulder at the rear side thereof (as designated at 53 in FIG. 2). This shoulder is generally perpendicular to the axis of the tubular member and engages the outer end of the ring to limit the insertion of the jaws into the tubular passageway. A clamping nut 60 is arranged to operatively engage this frusto-conical surface as the nut is threaded on the ring, the jaws are urged toward each other into clamping position, and the shoulder 53 is held against the outer end of ring 22. As can be seen, the inner surface of the nut is threaded adjacent its rear end for this purpose and the nut has a generally frusto-conical mating surface 61 adjacent its forward end to operatively engage the aforesaid frusto-conical surface of the jaws. A thin resilient gasket or bushing 64, preferably made of nylon, is disposed between the jaws and nut to cushion the tightening action as the nut is threaded on the ring and distribute the forces. Obviously, after the blade is inserted, the jaws are tightened by turning the nut so that it tightens against the bushing.

The blade need not be inserted the full length of the inner member and thus can be adjusted to various positions along the clamping faces, if desired. For this purpose, a projection 66 is located at the rear end of jaw 26 and extends laterally from clamping face 38 (FIG. 6). The projection engages jaw 28 and is arranged to hold the rear ends of the clamping faces spaced apart a distance generally equal to the blade thickness. Additionally, the projection serves as a longitudinal stop for the blade.

It is now deemed obvious that the present invention provides a saber-type saw having improved means for clamping the blade, that it has a minimum number of parts, and that the blade is clamped by a relatively easy procedure.

While I have described a preferred embodiment of my invention this has been done by way of illustration and not limitation, and I do not wish to be limited except as required by the appended claims.

I claim:

1. In a saw including an elongate blade having cutting teeth on one longitudinally extending edge thereof, the combination of: a longitudinally extending handle having front and rear ends and adapted to be held in the hand of the user, said handle having a front-opening tubular passageway disposed about a longitudinal axis and extending generally the full length of the handle, said handle having means defining a stop face surrounding said opening and disposed generally perpendicular to said longitudinal axis, a pair of complementary jaws each having an elongate inner portion closely received in said tubular passageway and extending generally the full length thereof, each jaw having means defining a shoulder generally perpendicular to the longitudinal axis and for engaging the stop face when the jaws are inserted into the tubular passageway, each jaw having a wedging portion outside the handle adjacent the front end thereof and diverging rearwardly from the blade, each jaw having means defining a clamping face adjacent the other jaw, said clamping faces extending generally the full length of the jaws and arranged for engaging a major area of the portion of the blade inserted therebetween, and clamping means releasably secured to the handle and operatively engaging the wedging portion of each jaw for applying peripheral pressure to the jaws and urging the clamping faces toward each other to hold the blade in place and for holding the shoulders engaged with the stop face.

2. The combination as set forth in claim 1 including a synthetic resin bushing shaped for encircling and engaging the wedging portions and for engagement by the clamping means.

3. The combination as set forth in claim 1 wherein said handle has means defining a slot at the front end thereof, and at least one of said jaws has means extending into said slot to non-rotatably hold the jaws with respect to the handle.

4. The combination as set forth in claim 1 wherein each of said jaws includes a forwardly projecting portion adjacent the edge of the blade opposite said toothed edge, each forwardly projecting portion having a clamping face coplanar with the clamping face of the inner jaw portion, the forwardly projecting portion clamping faces arranged to engage and rigidly hold a portion of the blade adjacent said opposite edge thereby exposing the cutting teeth for cutting purposes.

5. In a saw including an elongate blade having cutting teeth on one longitudinally extending edge thereof, the combination of: a longitudinally extending handle having front and rear ends and adapted to be held in the hand of a user, said handle having a front-opening tubular passageway extending generally the full length of the handle, a pair of complementary jaws each having an elongate inner portion closely received in said tubular passageway and extending generally the full length thereof, each jaw having means defining a clamping face adjacent the other jaw, said clamping faces extending generally the full length of the jaws and arranged for engaging a major portion of the blade inserted therebetween, a laterally extending projection at the rear end of the clamping face of one jaw for providing a longitudinal stop for the blade, said projection engaging the opposite jaw and arranged for holding the rear ends of the clamping faces spaced apart a distance generally equal to the blade thickness, and clamping means releasably secured to the handle for applying peripheral pressure to the jaws to hold the blade in place and for securing the jaws in the tubular passageway.

6. The combination as set forth in claim 5 including means on at least one of the jaws adjacent one longitudinal edge of the blade for providing a stop for said one blade edge.

7. In saw including an elongate blade having cutting teeth on one longitudinally extending edge thereof, the combination of: a handle having front and rear ends and adapted to be held in the hand of a user, said handle having a front-opening tubular passageway, a pair of complementary jaws each having an elongate inner portion received in said tubular passageway and extending generally the full length thereof, each jaw having means defining a clamping face adjacent the other jaw, said clamping faces extending generally the full length of the jaws and arranged for engaging a major portion of the blade inserted therebetween, each jaw having means defining a longitudinal recess at the side of the clamping face adjacent the toothed edge of the blade, each recess shaped for accommodating the set of the teeth whereby the blade is held without engaging the teeth, and clamping means releasably secured to the handle for applying peripheral pressure to the jaws to hold the blade in place and for securing the jaws in the tubular passageway.

8. In a saw including an elongate blade having cutting teeth on one longitudinal edge thereof, the combination of: a longitudinally extending handle having front and rear ends and a front-opening tubular passageway disposed about a longitudinal axis, a pair of complementary jaws each having an inner portion closely received in said tubular passageway, each jaw having means defining a clamping face adjacent the other jaw, a first lateral flange on one of the jaws adjacent one longitudinal edge of the blade and extending generally the full length thereof to provide a stop for said one blade edge, a second lateral flange on one of the jaws adjacent another longitudinal edge of the blade to provide a stop for said other blade edge, and clamping means releasably secured to the handle for engaging the jaws to hold the blade in place and to secure the jaws in the tubular passageway.

9. The combination as set forth in claim 8 wherein said first and second flanges are on the same jaw, said same jaw having a longitudinal recess between each flange and the clamping face and arranged to accommodate the set of the teeth, and the opposite jaw having a recess shaped for accommodating the set of the teeth and receiving the lateral flanges.

10. The combination as set forth in claim 9 wherein the handle includes a tubular member defining the tubular passageway and a resilient gripping portion encasing the tubular member, and including means on the jaws for positioning and aligning the jaws with respect to each other, said tubular member having means defining a slot at the front end thereof, means on the jaws extending into the slot to non-rotatably hold the jaws with respect to the tubular member, said jaws defining a generally frusto-conical surface disposed outside the tubular member and diverging rearwardly from the blade said jaws having a shoulder at the rear end of the frustoconical surface and generally perpendicular to the axis of said tubular member for engaging the front end of the tubular member to limit insertion of the jaws therein, a bushing shaped for encircling the frusto-conical surface, said tubular member having a threaded outer periphery adjacent its front end, and said clamping member threadedly engaged with the tubular member nad having an inner surface shaped for operatively engaging the bushing to urge the clamping faces toward each other as the clamping member is tightened and to hold the shoulder against the front end of the tubular member.

References Cited
UNITED STATES PATENTS 2,482,385  9/1949  Urban et al. _____ 30—329 X

FOREIGN PATENTS 132,733  8/1951  Sweden.

WILLIAM FELDMAN, *Primary Examiner.*

R. V. PARKER, JR., *Assistant Examiner.*